US007684443B2

(12) United States Patent
Fisher et al.

(10) Patent No.: US 7,684,443 B2

(45) Date of Patent: Mar. 23, 2010

(54) PCR CLOCK RECOVERY IN AN IP NETWORK

(75) Inventors: Jeffrey Fisher, Dublin, CA (US); Brian Schoner, Fremont, CA (US); Rajesh S. Mamidwar, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 451 days.

(21) Appl. No.: 11/808,363

(22) Filed: Jun. 8, 2007

(65) Prior Publication Data

US 2007/0286241 A1 Dec. 13, 2007

Related U.S. Application Data

(60) Provisional application No. 60/812,087, filed on Jun. 9, 2006.

(51) Int. Cl.
*H04J 3/06* (2006.01)
*H03L 3/00* (2006.01)
*H04L 12/28* (2006.01)

(52) U.S. Cl. ................ 370/503; 370/389; 375/E7.275; 375/E7.278; 348/423.1

(58) Field of Classification Search ......... 370/352-356, 370/389, 392, 368, 489, 503, 520; 375/354-376, 375/E7.271, E7.275, E7.278, E7.268, E7.022; 348/423.1, 512-518; 714/707-731; 327/141-163; 713/400-503; 340/3.2; 455/180.3
See application file for complete search history.

(56) References Cited

U.S. PATENT DOCUMENTS

| | | | | |
|---|---|---|---|---|
| 5,652,627 A * | 7/1997 | Allen | ......................... | 348/497 |
| 5,781,599 A * | 7/1998 | Shiga | ......................... | 375/376 |
| 6,002,687 A * | 12/1999 | Magee et al. | ............... | 370/394 |
| 6,072,832 A * | 6/2000 | Katto | .................... | 375/240.28 |
| 6,233,238 B1 * | 5/2001 | Romanowski et al. | ...... | 370/389 |
| 6,246,701 B1 * | 6/2001 | Slattery | ...................... | 370/503 |
| 2006/0078300 A1 * | 4/2006 | Salomons et al. | ............. | 386/85 |

* cited by examiner

*Primary Examiner*—Afsar M. Qureshi

(74) *Attorney, Agent, or Firm*—Sterne, Kessler, Goldstein & Fox P.L.L.C.

(57) ABSTRACT

An IP network includes a central entity and at least one customer premises equipment (CPE) device. The central entity generates a program clock reference (PCR) clock and provides audio-visual packets to a CPE based on the PCR clock. The CPE sets a first clock based on the PCR clock for decoding operations. The CPE sets a second clock that is independent from the first clock for audio and video output operations. For example, the CPE can process the audio-visual packets using the second clock.

11 Claims, 5 Drawing Sheets

PCR CLOCK RECOVERY IN AN IP NETWORK

CROSS REFERENCE TO RELATED APPLICATIONS

This application claims benefit to U.S. Provisional Patent Application No. 60/812,087, filed Jun. 9, 2006, which is incorporated herein by reference in its entirety.

BACKGROUND OF THE INVENTION

The inventions relate generally to clock recovery, and more specifically to program clock reference (PCR) clock recovery in an internet protocol (IP) network. The inventions apply even more generally to audio and video time management, clock control and display clock control. PCR clock recovery is an important component enabling a decoder clock to be synchronized with the encoder clock in a point to multipoint broadcast network.

In point-to-multipoint communication systems, an IP network supports bidirectional data communication between a central entity and multiple customer premises equipment (CPE). Example point-to-multipoint communication systems include cable modem systems, fixed wireless systems, and satellite communication systems. In each system, the communication path from the central entity to the CPE is typically referred to as the downstream, while the communication path from the CPE to the central entity is typically referred to as the upstream. A CPE may be a cable modem, a settop box, or a cable gateway, to provide some examples.

Audio-visual information may be transferred in an EP network in accordance with any of a variety of standards, such as the International Organization for Standardization/International Electrotechnical Commission 13818-1 International Standard, published on Nov. 13, 1994 (the ISO/IEC 13818 standard). This standard is consistent with MPEG2. The central entity of the point-to-multipoint communication system generates a program clock reference (PCR) clock in accordance with the standard and transmits the audio-visual information based on the PCR clock. The CPE(s) traditionally processes the audio-visual information for display using the PCR clock. However, audio-video information in IP networks often exhibits relatively large and irregular propagation delays, hindering the CPE(s) from adequately recovering the PCR clock. Moreover, PCR timestamps may not be sufficiently reliable for PCR clock recovery.

What is needed, therefore, is a system and method that addresses one or more of the aforementioned shortcomings of conventional PCR clock recovery techniques.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention.

In the drawings, like reference numbers indicate identical or functionally similar elements. Additionally, the leftmost digit(s) of a reference number identifies the drawing in which the reference number first appears.

DETAILED DESCRIPTION OF THE INVENTION

Although the embodiments of the invention described herein refer specifically, and by way of example, to point-to-multipoint communication systems and components thereof, including settop boxes, it will be readily apparent to persons skilled in the relevant art(s) that the invention is equally applicable to other devices and systems. It will also be readily apparent to persons skilled in the relevant art(s) that the invention is applicable to any apparatus or system requiring PCR clock recovery.

This specification describes one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

Overview

Conventional PCR clock recovery logic assumes a maximum network delay of approximately 2 milliseconds (ms), though delays of as large as 300 ms may be encountered in an IP network. Analog video outputs are sensitive to timebase variations, making it difficult to compensate for delays in clocking information quickly enough to avoid problems in the video and audio outputs of a CPE which often have very sensitive timing requirements. Avoiding these issues using conventional techniques requires extensive buffering of audio and video data. This buffering substantially increases channel change times in the IP network.

When decoders and outputs utilize the same timebase, even relatively small adjustments in the timebase can cause undesired effects and/or disturbances in video and audio outputs. By decoupling the input timebase used by the decoders from the output timebase used by the audio and video outputs, these effects can be avoided or substantially reduced. This allows for coarse adjustments in the decoder clocks to rapidly respond to network jitter conditions while allowing for more gradual or no adjustment of the clocks used by the CPE to output audio and video signals.

Example PCR Clock Recovery Embodiments

Figure 1:
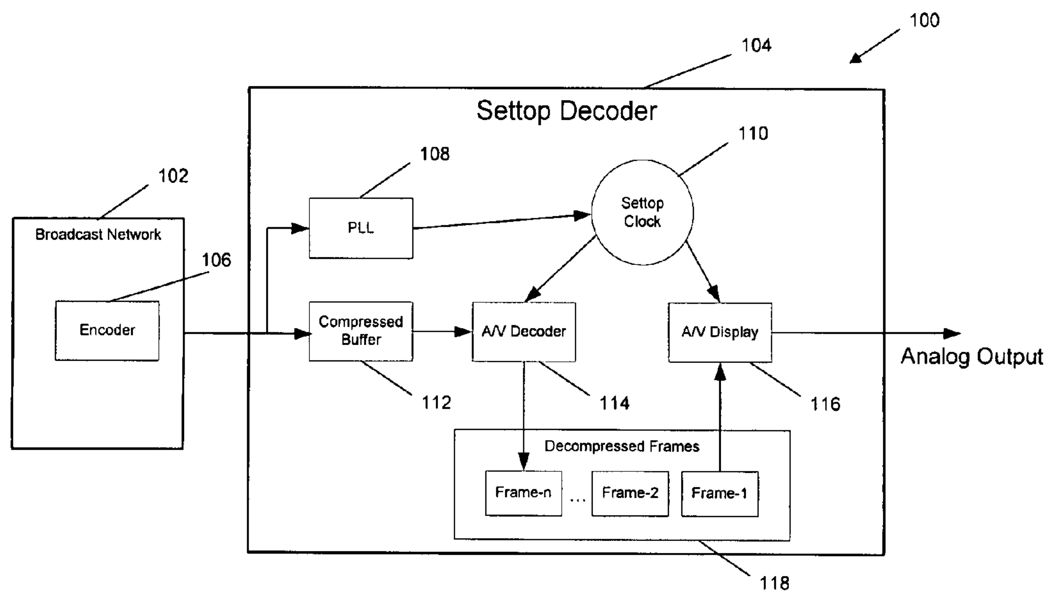
FIG. 1 is a block diagram of an example IP network.

FIG. 1 is a block diagram of an example IP network 100. In FIG. 1, IP network 100 includes a central entity 102 and a CPE 104. This particular example relates to a video distribution network. Central entity 102 is a broadcast network and CPE 104 is a settop box (settop decoder). The use of a video distribution network, here and later in this patent document and the labeling in the figures of central entity 102 and CPE 104 as "settop decoder" is not intended to limit the scope of the claimed inventions, but merely to provide an example to the reader. Persons skilled in the relevant art(s) will recognize that central entity 102 and CPE 104 may be any of a variety of devices/systems.

Central entity 102 includes an encoder 106 that encodes audio-visual packets according to a standard, such as, for example, the ISO/IEC 13818 standard (various standards are applicable for various types of systems). The ISO/IEC 13818 standard specifies a maximum allowable PCR spacing to facilitate proper PCR clock recovery at CPE 104. For example, the ISO/IEC 13818 standard specifies a PCR spacing of less than 100 ms.

Annex D of the ISO/IEC 13818 standard defines a well behaved system as one exhibiting less than 4 ms of network induced timing delay (i.e., jitter). In IP video streaming, it is common to observe jitter that exceeds these constraints (e.g. >300 ms). The situation can be further complicated by software induced jitter introduced while processing the IP video packets and/or while providing the payload to CPE 104 for de-multiplexing, decryption and decoding. ISO/IEC 13818 Annex D describes the timing model used in digital broadcast networks and the implications of relatively large network delay and PCR jitter. ISO/IEC 13818 Annex D further describes the need for a CPE 104 to have a consistent output clock to adhere to typical analog video display timing requirements.

In the FIG. 1 video distribution network example, CPE 104 includes a phase-locked loop (PLL) 108, a settop clock 110, a compressed buffer 112, an audio-video (A/V) decoder 114, an audio-video display 116, and a frame buffer 118. The encoded audio-visual packets received from central entity 102 are processed by PLL 108 and compressed buffer 112. PLL 108 generates/recovers settop clock 110 from PCRs in the transport stream. A/V decoder 114 uses settop clock 110 to decode the audio-visual packets that are buffered by compressed buffer 112. Frame buffer 118 buffers the decompressed/decoded audio-visual frames received from A/V decoder 114. A/V display 116 generates an analog output using settop clock 110 and the decompressed/decoded frames provided by frame buffer 118.

In typical broadcast decode settop devices, PLLs are not designed to handle large PCR jitter because of the timing requirements of analog display standards, such as those set forth by the National Television System Committee (NTSC). Accordingly, in FIG. 1, A/V decoder 114 and A/V display 116 share the same (or a tightly coupled) settop clock 110, which is corrected by PLL 108. In the embodiment of FIG. 1, it may be said that display timing "tracks" decode timing. Sections 0.4-0.6 of Annex D discuss this issue in greater detail.

Figure 2:
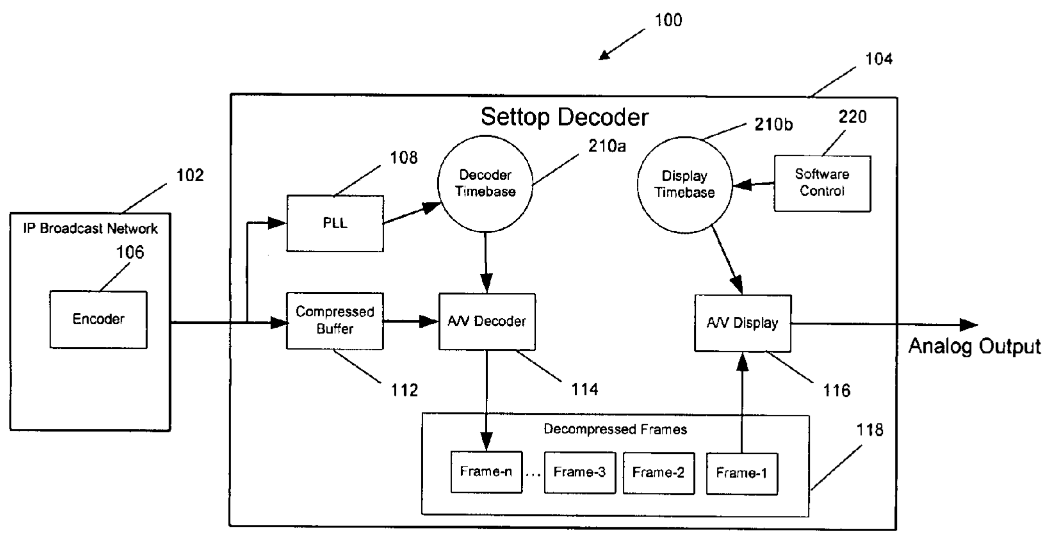
FIG. 2 is another block diagram of the example IP network shown in FIG. 1, according to an embodiment of the present invention.

One technique to compensate for relatively large delays and/or PCR jitter while still adhering to the rigid analog display timing requirements described above is to decouple the decoder clock from the display clock. FIG. 2 is another block diagram of the example IP network shown in FIG. 1, according to an embodiment of the present invention.

In FIG. 2, CPE 104 includes a first clock 210*a*, a second clock 210*b*, and a clock generation module 220. First clock 210*a* and second clock 210*b* are labeled as a decoder timebase and a display timebase, respectively, for illustrative purposes. Clock generation module is labeled as a software control for illustrative purposes and is not intended to limit the scope of the present invention. Clock generation module 220 may include software, hardware, firmware, or any combination thereof.

PLL 108 generates/recovers first clock 210*a* based on PCRs in the transport stream. A/V decoder 114 uses first clock 210*a* to decode the audio-visual packets that are buffered by compressed buffer 112. However, in FIG. 2*a*, A/V display 116 does not use first clock 210*a* to generates the analog output. Instead, A/V display 116 generates the analog output using second clock 210*b*. Second clock 210*b* is not generated based on PCRs in the transport stream. Instead, clock generation module 220 sets second clock 210*b*. Second clock 210*b* is generated independently from first clock 210*a*. Second clock 210*b* may have a different frequency and/or phase than first clock 210*a*.

Decoupling first clock 210*a*, which is associated with A/V decoder 114, and second clock 210*b*, which is associated with A/V display 116, allows for second clock 210*b* to adhere to the stringent analog display timing requirements but allows for more course adjustment of A/V decoder 114. By employing techniques in A/V decoder 114 to drop, repeat, and interpolate decoded frames, fairly course adjustments of first clock 210*a* can be masked. A substantially slower adjustment of second clock 210*b* adhering to the output timing requirements can be employed to keep first clock 210*a* and second clock 210*b* loosely synchronized. In an embodiment, network 100 performs sync-slip operations in the display pipeline to handle a plurality of display source and output formats. Decoupling first and second clocks 210*a-b* will utilize this established behavior to avoid underflows and overflows in the display pipeline caused by the loosely synchronized first and second clocks 210*a-b*.

Figure 3:
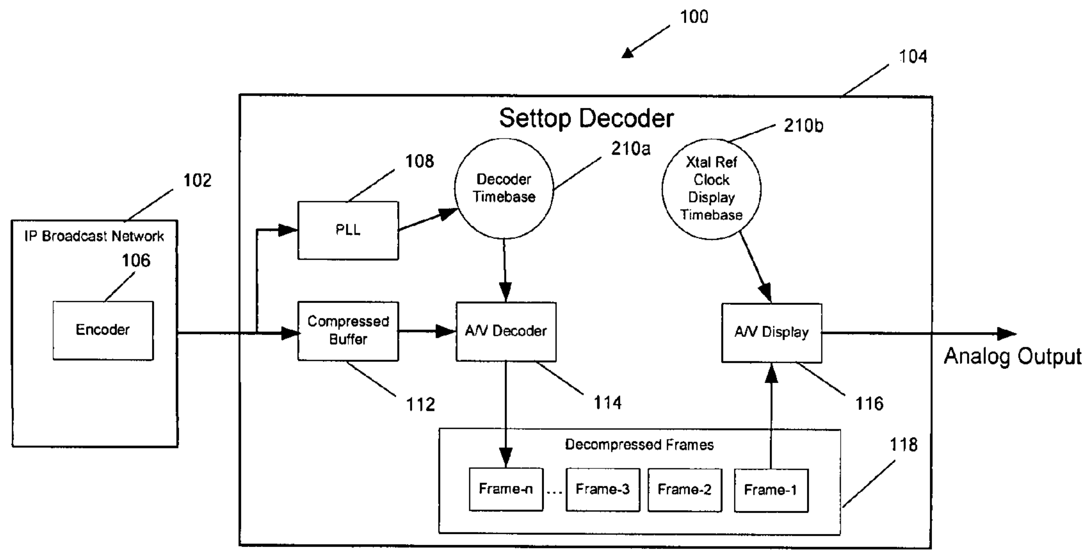
FIG. 3 is a block diagram of an example IP network having first and second clocks, with the second clock being a fixed crystal reference clock.

Any of a variety of techniques may be used to generate second clock 210*b*. In an example embodiment, shown in FIG. 3, second clock 210*b* is a fixed crystal reference clock. Unlike first clock 210*a*, the fixed crystal reference clock does not track the PCR clock that is received by CPE 104. The analog output provided by A/V display 116 may sync-slip, meaning that the frame rate of a window does not match the frame rate of A/V decoder 114. Sync-slipping causes the window to skip or repeat frames.

Assuming for illustrative purposes that the video source and the crystal used to generate second clock 210*b* are each accurate within +/−60 parts-per-million (ppm), the total difference would be at most 120 ppm, corresponding with a maximum sync-slip of $^{120}/_{1000000}$*30 frames/sec*60 sec/min*60 min/hour=13 frames/hour. Based on these assumptions, a sync-slip would occur on average once every 4.5 minutes, worst case.

In this embodiment, using the fixed crystal reference clock for display timing necessitates setting the display timebase for each output to a fixed value. The method for fixing the display clock or timebase may vary from system to system. Some systems support dual-decode and dual-display, e.g. "Picture in Picture". Such systems may support voice over Internet protocol (VoIP) on one display, but not the other. These systems may need to use a fixed timebase for one display, but not for the other.

Figure 4:
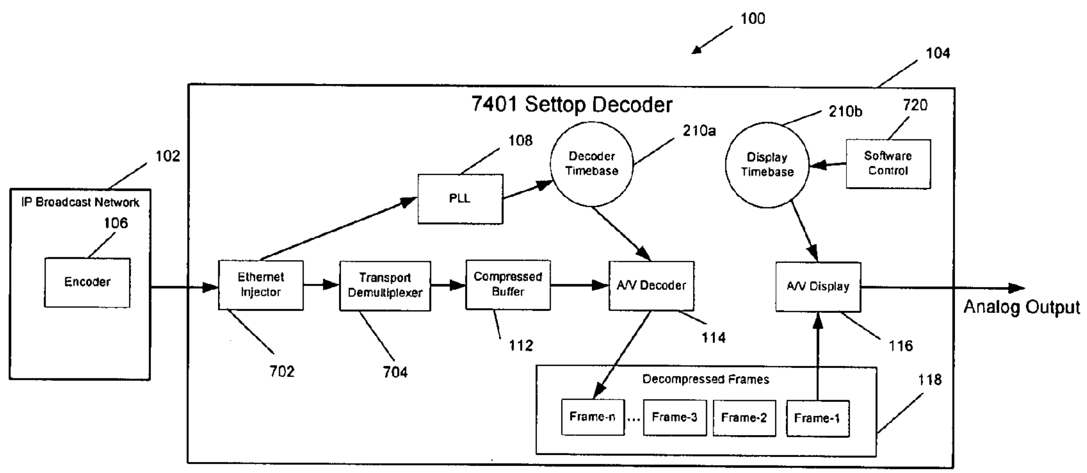
FIG. 4 is a simplified block diagram showing an example of transport paths of a BCM7401 chip, according to embodiments of the present invention.

FIG. 4 is a simplified block diagram showing, as an example, transport paths of a BCM7401 chip ("7401 embodiment example", or "7401"), manufactured by Broadcom Corporation, according to embodiments of the present invention. This chip is suitable for use, for example, in a settop box in a video distribution network.

In this example embodiment, which actually implements a generalization of the first example, first clock 210*a* and second clock 210*b* are based on different timebases. Software control 720 is used to adjust the second clock to speed up or slow down the display timebase within the tolerances of the display. The first timebase is used for decode timing, and the second timebase is used for display timing. Audio-visual decoders, such as A/V decoder 114, reference the first timebase. Display outputs, such as A/V display 116 reference the second timebase.

For normal (non-VoIP) broadcasts, the first and second timebases both are locked to the incoming stream, such that the system behaves normally, using PCR values in the input stream. This is possible because the PCR values are reliable and will not cause timing problems the display outputs. For VoIP broadcasts with large jitter and unreliable clock information, only the decoder timebase which can tolerate coarse timebase adjustment can be corrected or adjusted using PCR values in the incoming stream. The second timebase is locked to the fixed crystal reference clock or adjusted by software in a more controlled fashion. This is important because display or output timebases must transition relatively slowly or suffer video artifacts on the display outputs.

Network jitter and delays in a VoIP network can be larger than those seen in typical broadcast networks (i.e. 300 ms vs 4 ms) and IP software protocol stacks in the settop decoder can introduce additional processing delay. In this 7401 embodiment example the following adjustments are made to handle these conditions:

- Decouple decoder and display timebases (clocks). The 7401 has two separate timebase controls as well as the ability to fix the display or decoder clock frequencies.
- Increase amount of data in the decoder compressed buffer to compensate for additional network delay. For example if the maximum network delay is 300 ms extra of data must be buffered to insure the compressed data buffer never becomes empty. This is accomplished on 7401 by delaying decode by 300 ms.
- Decrease PLL sensitivity because PCR values are less reliable and tend to exceed conventional thresholds. On the 7401 the PCR discard threshold can be configured by software to account for the large maximum delay or jitter in the network.
- Allow for more course adjustments in decoder clock which is possible because with a decoupled decoder and display clock the decoder can tolerate these course adjustments. The 7401 decoder timebase control can be configured to accept larger or more coarse adjustments.
- Prevent software processing delays in the CPE settop decoder by implementing an Ethernet injector 702 (also see FIG. 6 functional flowchart) which utilizes DMA (Direct Memory Access) hardware to "inject" audio/video data directly into a transport demultiplexor 704 as if the IP audio/video data were received from a traditional broadcast digital network receiver/demodulator.

Decoupling first clock 210*a* and second clock 210*b* enables CPE 104 to perform a faster channel change, as compared to conventional techniques for handling large network delays. For example, conventional decoders require more buffering because they cannot cope with the large discontinuities or delays in an IP network and therefore sometimes utilize the PTS (presentation time stamp) in the audio/video stream to configure the local decoder and display timebase. Typically this technique adds a half second or more to the channel change time because more data must be buffered before a valid PTS is observed by the decoder and used to program the decoder timebase.

Figure 5:
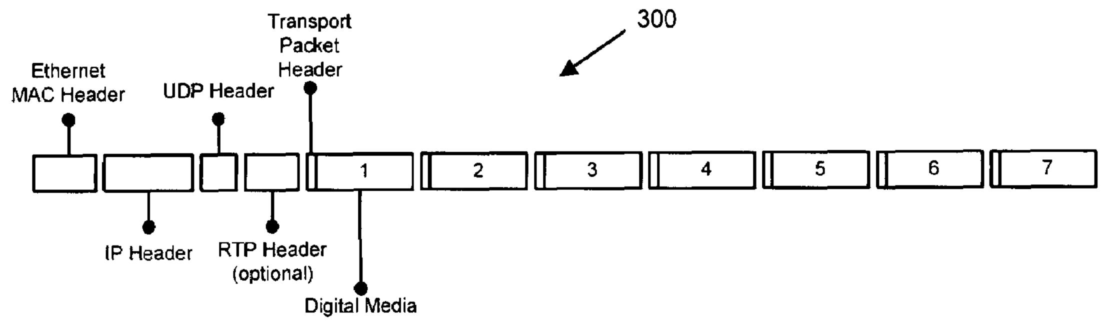
FIG. 5 illustrates an example Ethernet frame, according to an embodiment of the present invention.

FIG. 5 illustrates an example Ethernet frame, according to an embodiment of the present invention. The physical interface for IP network 100 is Ethernet, and video stream packets are segmented to fit within a single Ethernet frame 300, as shown in FIG. 4. As shown in the figure, a packet includes an Ethernet MAC Header, an IP Header, a UDP Header, a RTP Header (optional), a Transport Packet Header, and seven (7) transport packets. Audio and video is encapsulated in the transport packets. Software induced jitter may be mitigated by providing Ethernet A/V payload directly to transport demuliplexor (in 7401 figure above), for example.

Figure 6:
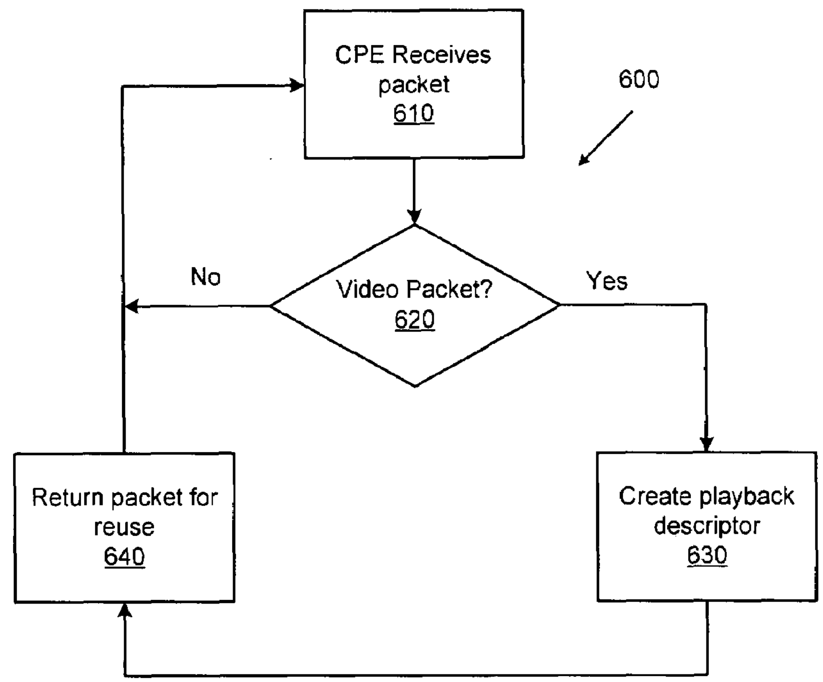
FIG. 6 is a flowchart 600 of a method of providing packets to a CPE in accordance with an embodiment of the present invention.

FIG. 6 is a flowchart 600 of a method of injecting packets to a CPE in accordance with an embodiment of the present invention. The invention, however, is not limited to the description provided by flowchart 600. Rather, it will be apparent to persons skilled in the relevant art(s) from the teachings provided herein that other functional flows are within the scope and spirit of the present invention.

Flowchart 600 will be described with continued reference to the BCM7401 chip described above, though the method is not limited to this embodiment. In this preferred embodiment the Ethernet injector carries out all of the steps shown in FIG. 6.

Referring now to FIG. 6, the CPE receives a packet at block 610. If the packet is a video packet, as determined at decision block 620, then a playback descriptor is created at block 630. For example, a payload offset may be calculated e.g. by Ethernet injector shown in FIG. 4 into each Ethernet frame, and the playback descriptor is assigned to feed the payload to the transport demux of the BCM7401 chip. The packet is returned for reuse at block 640, and control returns to block 610. On the other hand, if the packet received at block 610 is not a video packet, as determined at decision block 620, then control returns to block 610.

In the embodiment of FIG. 6, IP packets are filtered and then provided directly to the BCM7401 chip via the transport playback without copying or intermediate buffering, which may reduce channel change time, reduce CPU overhead, and/or reduce software induced jitter, to provide some examples. This method of injecting packets may minimize system complexity while substantially reducing software induced jitter.

Figure 7:
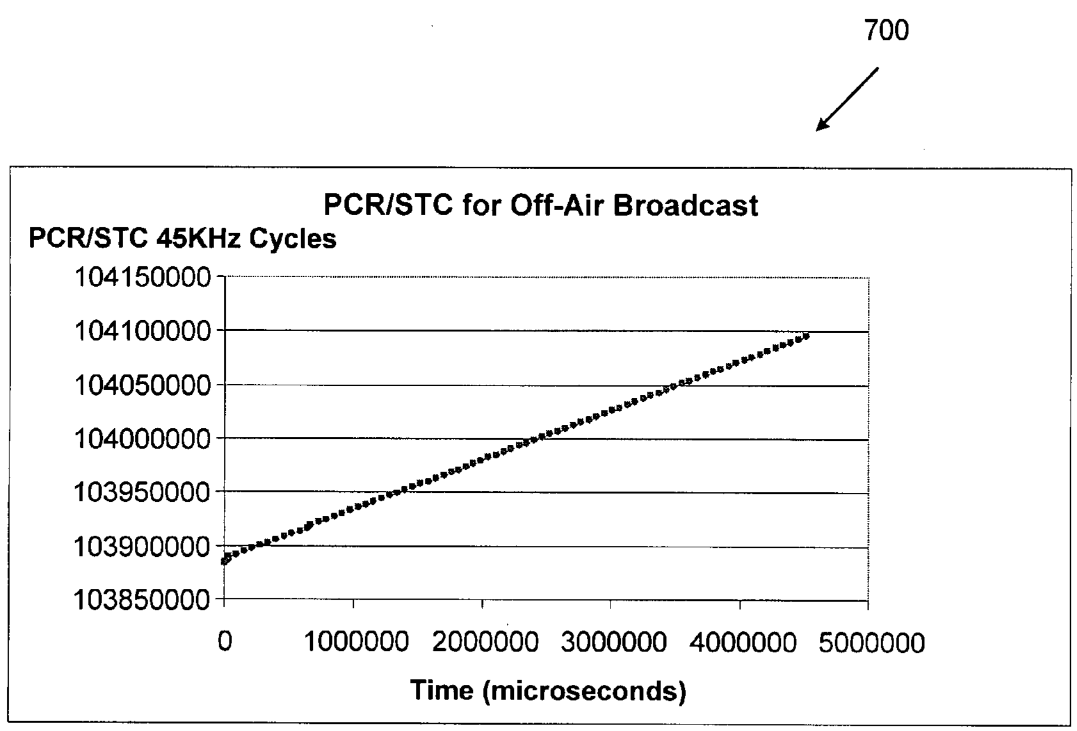
FIG. 7 shows a plot of PCR/STC with reference to time for an off-air broadcast, according to an example embodiment of the present invention.

In broadcast video networks, jitter is minimal and PCRs arrive at a precise rate. FIG. 7 shows a plot 700 of PCR/STC with reference to time for an off-air broadcast, according to an example embodiment of the present invention. In the embodiment of FIG. 7, PCRs are shown to arrive at least every 100 ms. However, the scope of the present invention is not limited in this respect.

IP networks generally are not well behaved, even in a controlled laboratory environment. When PCR clock recovery logic used in conventional broadcast networks is used for an IP delivered stream it is not uncommon for the decoders to exhibit problems, such as A/V decoder 114 shown in FIGS. 1 and 2, will periodically fall in an out of lock because the default configuration of the PCR clock recovery logic identifies PCR discontinuities in the IP delivered stream. In the 7401 this behavior can be monitored to develop optimized thresholds and buffering to handle the delay and jitter present in a particular IP network.

The following Table A represents an example embodiment showing PCR discontinuities after starting an IP stream decode. In this embodiment, using typical broadcast thresholds in an IP network the behavior described in 0039 is observed. The value "1" in the pcr_invalid column coincides with a disruption in both audio and video decode.

TABLE A

| Usec | Pcr | pcr_invalid | load |
|---|---|---|---|
| 0 | 7447953 | 0 | 0 |
| 56 | 7447953 | 0 | 1 |
| 28240 | 7452005 | 1 | 0 |
| 57131 | 7456050 | 1 | 0 |
| 132983 | 7460103 | 0 | 0 |
| 133082 | 7460103 | 0 | 1 |
| 232901 | 7464156 | 1 | 0 |
| 322910 | 7468201 | 1 | 0 |
| 393001 | 7472254 | 0 | 0 |
| 393100 | 7472254 | 0 | 1 |

TABLE A-continued

| Usec | Pcr | pcr_invalid | load |
|---|---|---|---|
| 482903 | 7476314 | 0 | 0 |
| 511507 | 7480351 | 1 | 0 |
| 662993 | 7484404 | 1 | 0 |
| 752897 | 7488457 | 0 | 0 |

In embodiments, network induced jitter of 300 ms and minor data errors can cause the decoder compressed data buffers (CDB), such as compressed buffer 112 shown in FIGS. 1 and 2, to underflow. To compensate, the depth of the audio and video CDB is increased by providing a "display offset" for video and an "A/V offset" for audio. Utilization of the display offset and the A/V offset delays the decoders, allowing the CDBs to run much deeper and increasing the resilience to network jitter. The configuration for the respective offsets and the CDB size is dependent upon the network environment.

To validate using the BCM7401 hardware for clock recovery, a test program may be used to intercept and rebroadcast multicast IP video streams, intentionally introducing periodic jitter. This has the effect of stopping data flow for up to 300 ms, for example, then delivering the delayed data at a bit rate substantially higher than the average stream bit rate until a steady state is again reached.

Figure 8:
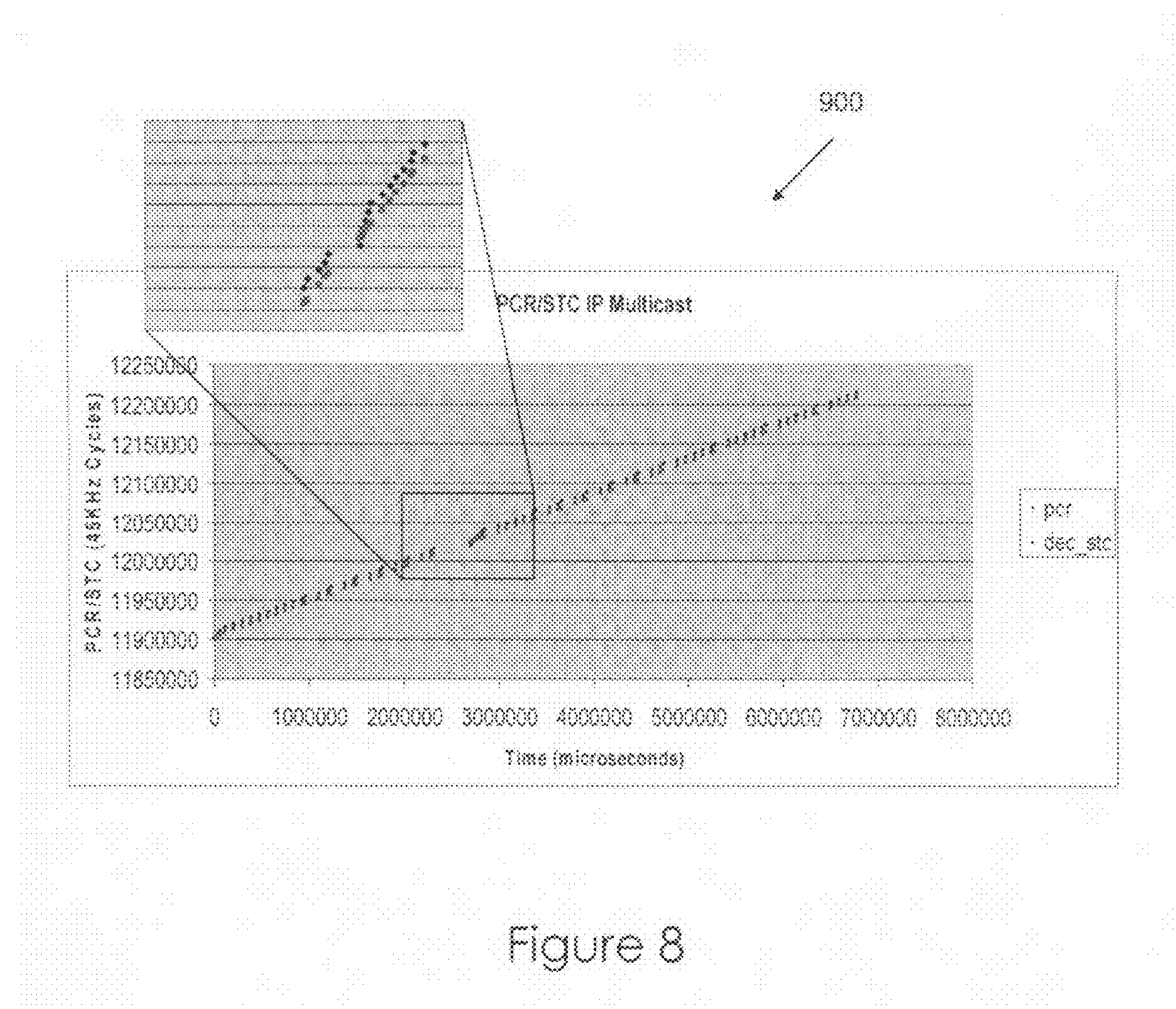
FIG. 8 shows a plot of PCR/STC with reference to time for an IP multicast, according to an example embodiment of the present invention.

FIG. 7 depicts the steady arrival of PCRs in a typical broadcast network over a sample period of time. FIG. 8 is a graphical representation 900 of PCR/STC with reference to time for an IP multicast, according to an example embodiment of the inventions. The PCR/STC values correspond to arrival times of the PCRs. A 300 ms discontinuity is shown in FIG. 8 at approximately 2.5 sec into the decode. As shown, the PCR values bunch up after the discontinuity.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Moreover, firmware, software, routines, instructions, etc. may be described herein as performing certain actions. However, it should be appreciated that such descriptions are merely for convenience and that such actions in fact result from computing devices, processors, controllers, or other devices executing the firmware, software, routines, instructions, etc.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed is:

1. A customer premises equipment (CPE) device configured to receive audio-visual packets associated with a program clock reference (PCR) clock, comprising:
- a phase-locked loop (PLL) to set a first clock based on the program clock reference clock;
- a second clock that is independent from the first clock;
- an audio-visual decoder to decode the audio-visual packets based on the first clock; and
- an audio-visual display to generate an analog signal based on the audio-visual packets and the second clock.

2. The CPE device of claim 1, wherein the second clock is based on a fixed crystal reference clock.

3. The CPE device of claim 1, further comprising:
- a clock generation module to set the second clock.

4. The CPE device of claim 1, further comprising:
- a buffer coupled to an input of the audio-visual decoder to buffer the audio-visual packets.

5. The CPE device of claim 1, further comprising:
- a buffer coupled between the audio-visual decoder and the audio-visual display to buffer the audio-visual packets.

6. In a customer premises equipment (CPE) device, a method of processing audio-visual packets, comprising:
- generating a first clock based on a program clock reference (PCR) clock;
- decoding the audio visual packets based on the first clock;
- generating a second clock that is independent from the first clock; and
- generating an analog signal based on the audio-visual packets and the second clock.

7. A customer premises equipment (CPE) device configured to receive audio-visual packets associated with a program clock reference (PCR) clock, comprising:
- means for generating a first clock based on a program clock reference clock;
- means for decoding the audio visual packets based on the first clock;
- means for generating a second clock that is independent from the first clock; and
- means for generating an analog signal based on the audio-visual packets and the second clock.

8. The CPE device of claim 7, wherein the means for generating the second clock is based on a fixed crystal reference clock.

9. The CPE device of claim 7, wherein the means for generating a second clock includes a clock generation module to set the second clock.

10. The CPE device of claim 7, further comprising:
- a buffer coupled to an input of the audio-visual decoder to buffer the audio-visual packets.

11. The CPE device of claim 7, further comprising:
- a buffer coupled between the audio-visual decoder and the audio-visual display to buffer the audio-visual packets.

* * * * *